Aug. 27, 1968  A. L. JONES  3,398,831
FILTER STRUCTURE

Filed Jan. 20, 1966  2 Sheets-Sheet 1

INVENTOR.
ADRIAN L. JONES
BY M. Ralph Shaffer
HIS ATTORNEY

Aug. 27, 1968 — A. L. JONES — 3,398,831
FILTER STRUCTURE
Filed Jan. 20, 1966 — 2 Sheets-Sheet 2

INVENTOR.
ADRIAN L. JONES
BY
HIS ATTORNEY

United States Patent Office 3,398,831
Patented Aug. 27, 1968

3,398,831
FILTER STRUCTURE
Adrian L. Jones, 2157 E. 3380 S.,
Salt Lake City, Utah 84109
Filed Jan. 20, 1966, Ser. No. 521,980
1 Claim. (Cl. 210—198)

ABSTRACT OF THE DISCLOSURE

The present invention supplies improvements to a filter tank. These improvements comprise:
(1) provision for loosening solid material such as fertilizer which might otherwise tend to gravitate at the bottom of the tank adjacent its supply pipe, and
(2) provision, with a swirl, fluid-sweeping feature associated with the underneath side of the filter plate of the tank, of an improvement, the improvement comprising a multiplicity of holes disposed within said filter plate in a manner such that the hole edges protrude away from the bottom planar surface of the plate into the unfiltered zone of the tank. Such a provision insures that the filter plate will remain unclogged.

---

The present invention relates to filtering tanks and, more particularly, to a new and improved filtering tank which can optionally be used to both water and fertilize or otherwise treat, simultaneously, large areas of grass such as those found in parks, golf courses, and the like.

Accordingly, a principal object of the present invention is to provide a new and improved filtering tank for removing dirt and other accumulations from inlet water, to provide a clean and substantially debris-free supply of water to any one of a number of types of sprinkler devices, "Rainbirds," and similar devices. Such filtering is necessary not only to improve the quality of the water output stream but, more importantly, to prevent clogging of sprinkling devices.

An additional object of the invention is to provide a new and improved filtering tank which includes means for enabling the introduction of fertilizers, insecticides, and/or fungicides within the tank, this so that the treating agent used may be gradually combined with the water in either a suspension condition or an entirely dissolved condition, so as to water and treat simultaneously any desired area of terrain.

An additional object of the invention is to provide baffle plate means within the filtering tank described so as to aid in directing fluid flow against the proper surface of the filtering screen, to remove dirt and debris accumulation therefrom, and additionally, optionally, to effect a vortex action within the tank itself.

An additional object is to provide reinforcement for filtering screens within a filtering tank such that the water streams introduced into the tank are imposed directly over the under-surface of a filtering screen, such action serving not only to clean the screen but to provide a vortex action within the tank to assist in the fertilizer dissolvement within the tank.

A further object is to provide a new and improved combination filtering and treating tank.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

Figure 1:
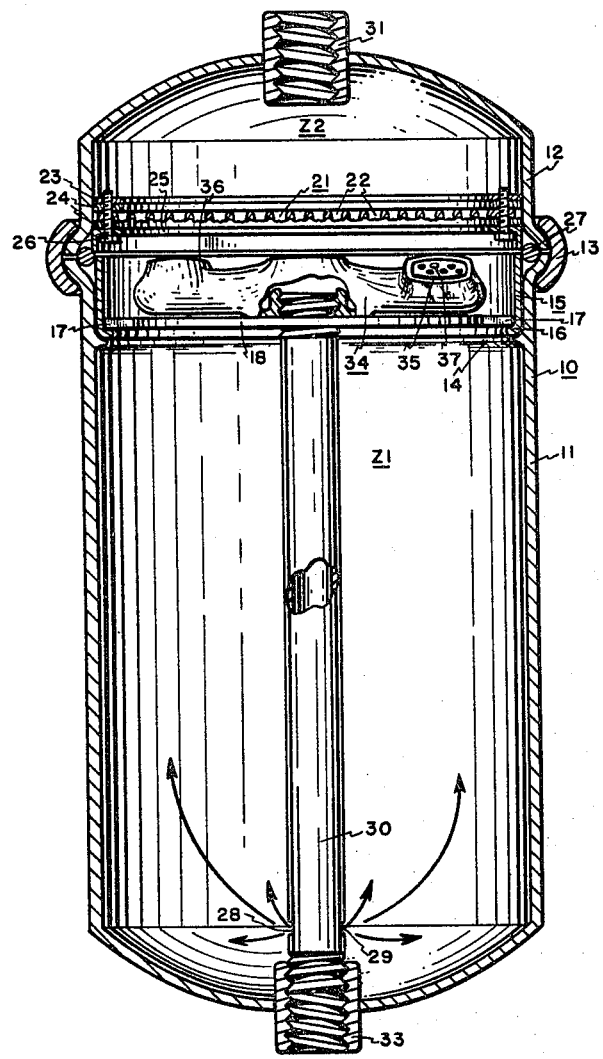
FIGURE 1 is an elongate, vertical section of a filtering tank in a preferred form of the invention thereof.
Figure 2:
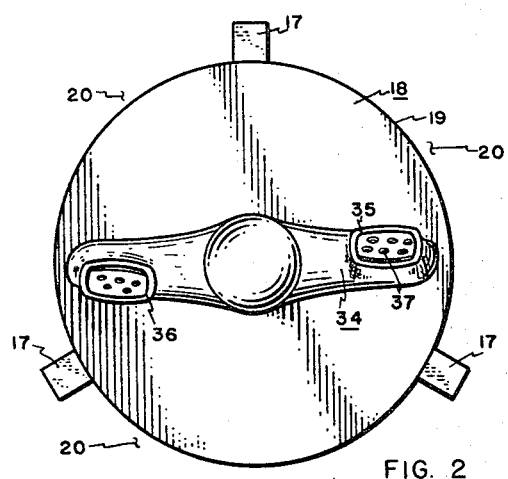
FIGURE 2 is a plan view looking down on the baffle plate and spray-head combination of the structure in FIGURE 1.

In FIGURE 1 the tank 10 includes a tank member 11 and a tank top 12. The tank member 11 and tank top 12 are selectively secured together by a conventional tank clamp 13. The design of the clamp 13 is strictly conventional, is presently used for oil drums and their tops, and can take any number of forms such as a handle and over-toggle link, simply secured together by a tightening screw, and so forth. The design of the clamp 13 forms no part of the present invention; there are many on the market presently which can be used. Tank member 11 includes bead or inwardly-directed protuberance 14 which supports ring 15; the latter is pressed into or otherwise disposed within tank member 11, as shown. The ring 15 also preferably includes a ring flange 16 which supports, in turn, support fingers 17 of baffle plate 18. Baffle plate 18 is shown in FIGURE 2 and may consist simply of a disk. In any event, it is noted that the outer periphery 19 of the baffle plate is sufficiently indented with respect to the outward extensions of support fingers 17 that spaces 20 are present and provide communication into the interior of the tank member. This is for the purpose of the introduction of fertilizing agents into the tank interior.

The tank top 12 is provided with a filter means such as filter means 21, the same being provided with a multiplicity of apertures 22. The filter screen, while it may take the form of a conventional screen, is preferably a plate punched with a multiplicity of apertures, the apertures being so punched in the plate that their edges protrude downwardly with respect to the plate. This is for the purpose of providing edges which accumulate dirt and other debris without substantially restricting the apertures through the filter means. Hence, a fluid spray directed against the under-surface of the filter screen will tend to keep the same clean and, additionally, will not plug up the multiplicity of holes in the filter plate or filter screen used.

The filter means 21 may be disposed in place by tank top flange 23, gaskets 24 and ring 25, the latter being bolted in place by screws or bolts 26.

The tank top 12 and tank member 11 are secured together by the adjustable clamp 13, as before mentioned, and by the use of an O-ring seal, for example, see seal member 27.

Also preferably included are apertures 28 and 29 and the conduit 30, this for injecting water into the lower area of the tank member so as to keep the fertilizer in a condition ready for dissolving into or suspension in the fluid preparatory to its travel through the filter means. In this connection, the tank member 11 and tank top 12 provide an interior separated by filter screen 21 into inlet unfiltered zone Z1 and outlet filtered zone Z2. Outlet connection 31 is provided the tank top 12 and communicates with filtered outlet zone Z2. Inlet connection 33 is affixed to conduit 30, and the latter is provided at its end with a spray member 34. Spray member 34 is preferably threaded onto the conduit 30 and includes spray heads 35 and 36 which are oriented upwardly against the filter screen and in opposite directions, mutually spaced from the filter screen, so that a swirling or vortex takes place in the filter screen so as to clean debris therefrom and to provide an upward surge of fluid and fertilizer through the filter screen. The spray heads 35 and 36 may be inwardly open or provided with a multiplicity of jets or holes 37, so as to supply increased pressure against the underside of the filter screen.

The structure shown in FIGURES 1 and 2 operates as follows:

At the outset it is to be mentioned that the structure of FIGURES 1 and 2 is intended primarily for use in the out-of-doors such as golf courses, large parks, and so forth. Inlet connection 33 is adapted for coupling to any type of fitting that may be present, whether in the ground or above-ground. Prior to the connection of a fluid source to inlet connection 33, the tank top 12 will be removed from tank member 11 and sufficient fertilizer poured into the unit so that the same descends downwardly through spaces 20 and past the baffle plate 18 into the interior of tank member 11. Subsequently, the seal 27 is tightened down through the use of clamp 13 so that tank top 12 is sealingly secured to tank member 11.

At this point the inlet fluid, i.e. water source, is connected to inlet connection 33 and the water proceeds through conduit 30 into and through spray member 34. Water proceeding through spray member 34, leaves heads 35 and 36 so as to produce a spray against the underside of filter screen 21. This action serves two purposes. In the first place it sprays debris and dirt from the underside of the filter screen and, additionally, creates a swirling action motion of the water so as to draw upwardly on the fertilizer in the bottom of tank member 11. In this connection the apertures 28 and 29, for example, serve ideally to keep the fertilizer accumulations in the bottom of the tank sufficiently "loose" so that the same is easily dissolved in water in inlet unfiltered zone Z1 and brought up by the vortex action through screen 21 and subsequently out the outlet connection 31. While the apertures 28 and 29 are not strictly necessary, their use is highly recommended for the purposes described.

While the heads 35 and 36 may be of any one of a number of configurations, the opening or openings in each head should be sufficiently small to produce sufficient pressure against the underside of the filter screen to keep the same clean at all times.

When it is desired to clean the equipment of FIGURES 1 and 2, then the tank top 12 is removed through the removal or loosening of clamp 13; baffle plate 18 and spray member 34 may be removed, and the sludge and other debris simply dumped from the interior of the tank.

Figure 3:
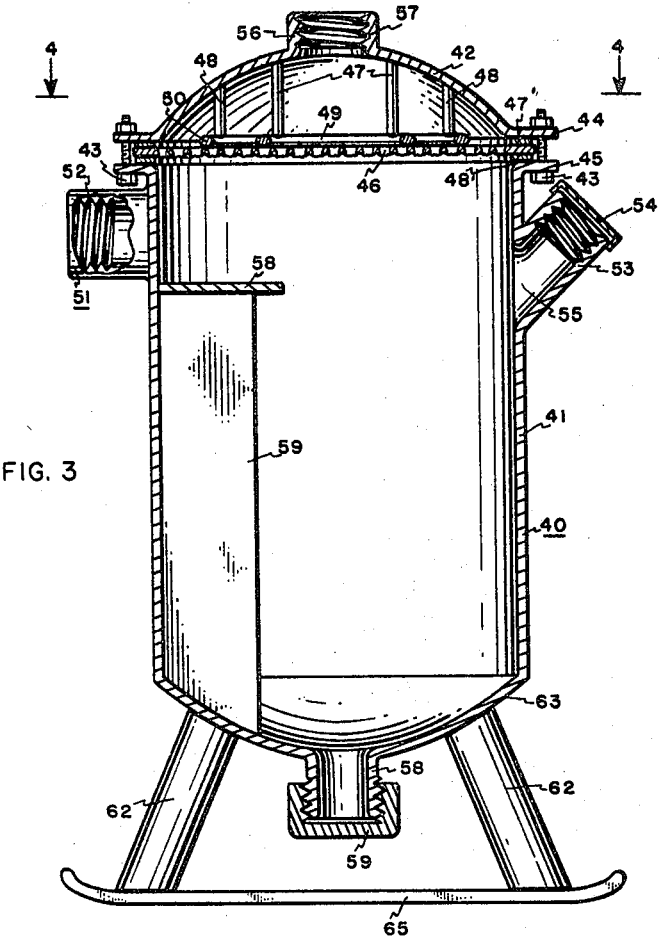
FIGURE 3 is an elongate vertical section of a second form of the filtering tank, built according to the principles of the present invention and is taken along the center plane thereof.
Figure 4:
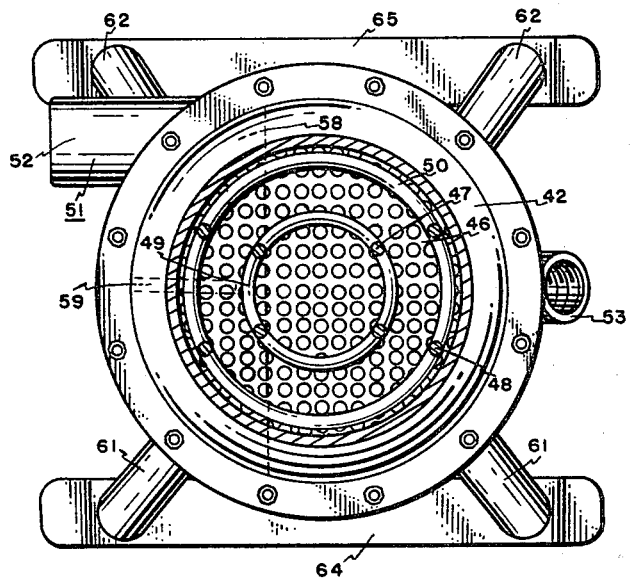
FIGURE 4 is a plan view in section looking down and taken along the line 4—4 in FIGURE 3.

In FIGURES 3 and 4 an additional embodiment of the invention is shown. Tank 40 includes tank member 41 and tank top 42. The two, this time, are secured through attachment means 43 as shown and the provision of aperture flanges 44 and 45. A filter means in the form of a filter screen or plate, for example, is provided at 46 and is bolted between the tank member 41 and tank top 42 via attachments 43 and with the use of sealing gaskets 47' and 48' in the manner shown. The filter screen or plate 46 may take the same form as that shown at 21 in FIGURE 1.

Legs 47 and 48 may be used to secure reinforcing rings 49 and 50, respectively, to the tank top 42. The rings 49 and 50 are disposed proximate the horizontal level of the filter screen 46 so that the filter screen will not tend to bow outwardly away from the inlet means 51. In this connection inlet means 51 may take the form of an attachment boss and, as seen in FIGURE 4, is directed off-center with respect to filter screen 46 so as to produce a swirling motion or vortex of water beneath the filter screen, this to clean the screen and to supply the vortex action above-mentioned with respect to the embodiments shown in FIGURES 1 and 2.

In addition to being provided with an inlet means 51, the tank member 41 also includes a fertilizer admittance aperture 53 provided threaded cap 54. It is seen at this time a separate and independent, fertilizing-admittance aperture 55 is supplied for the introduction of fertilizer material as necessary. It will be mentioned, of course, that the fertilizing material will be introduced into the tank preparatory to the application of water pressure at inlet means 51. The outlet means 56 takes the form of an outlet threaded boss 57 supplied the tank top 42.

For convenience of removal of dirt, sludge, and other accumulations and debris, the tank member 41 is supplied with a depending clean-out port 58 which is preferably threaded and includes cap 59. To facilitate clean-out the outlet orifice 57 and fertilizer orifice 53 may be plugged while the cap is removed at 59, and pressure applied to inlet orifice 51. This will clean out all sludge and accumulations of debris within the tank member 41.

In the structure shown in FIGURE 3 the tank member 41 includes horizontal baffle plate 58, taking somewhat the form of a sector of a circle, and vertical baffle plate 59. The horizontal baffle plate 58 tends to keep fluid entering the tank from inlet 51 up against the bottom surface of the filter screen 46. This, again, produces a fluid "sweeping" of the under-surface of the filter-screen or plate, to keep the same clean, and additionally, provides a swirling vortex of fluid which tends to draw fertilizer upwardly from the bottom interior of the tank proper. The vertical baffle plate 59 has been found to be appropriately included in order to reduce somewhat the vortex action in the lower region of the tank, this to slow down somewhat the vortex action and the dissolving of the fertilizer agent within the tank preparatory to the carrying thereof, with the water, through filter screen 46.

Legs 61 and 62 may be provided by welding the same to the bottom surface 63 of tank member 41; a provision of skids 64 and 65 and their securement to the bottom ends of legs 61 and 62 provide for easy movement of the tank from one place to another.

It is thus seen that there is provided in the present invention a new and useful filtering tank which optionally and preferably includes fertilizer introduction means. The tanks in both cases, that is, in the preferred embodiments illustrated in FIGURES 1–2 and FIGURES 3–4, provide for a swirling vortex action of fluid immediately underneath the bottom surface of the filter screen provided. It is to be noted that in both instances the inlet fluid enters in a direction which is off-set with respect to the center of the screen. This is to supply a sweeping, tangential vortex action against the underneath side of the filter screen, to keep the latter clean, and also to draw fertilizer upwardly into this area prior to the passage thereof through the filter screen. Reinforcement rings 49 and 50 are optionally supplied in one or both cases so as to keep the screen from being deformed in a direction toward the fluid outlet of the equipment.

The above designs have provided unusually excellent results both in filtering action and in the gradual dissolving of fertilizer materials in water preparatory to the combination passing through the filtering screen of the device. The structure of the present invention is ideally suited for watering and also for simultaneous watering and fertilizing large lawns and other areas such as golf courses, parks, and the like. The equipment may also be used for disbursing in-water-treating agents, other than fertilizer, such as, for example, insecticides and fungicides, where desired.

In all embodiments of the present invention the equipment is ideally suited for immediate coupling to the "quick couplings" conventionally installed on golf courses and in parks. Furthermore, sprinkling equipment such as those going under the name "Rainbird," and others are easily and readily attachable directly to the outlet connection 31 in FIGURE 1. This makes a unique, compact, and yet highly effective unit for watering, fertilizing, or otherwise treating large areas of turf and ground cover.

The units disclosed in detail in the present invention are currently in use and have enjoyed huge marketing success in a multi-state area.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:
1. A fluid, filter tank including, in combination, fluid tank means, filter means disposed within said fluid tank means and defining respective inlet unfiltered and outlet filtered zones within said fluid tank means, inlet means provided said fluid tank means and communicating with said inlet unfiltered zone, outlet means provided said fluid tank means and communicating with said outlet filtered zone, said fluid tank means being provided with means for enabling the selective introduction of treating agent means within said inlet unfiltered zone of said fluid tank means, and wherein said tank means comprises a vertically disposed tank; said inlet unfiltered zone being disposed beneath said outlet filtered zone; said inlet means comprising an inlet connection, a spray member disposed beneath and in proximity with said filter means, elongate conduit means interconnecting said spray member and said inlet connection, said conduit means being provided with aperture means at the base thereof for unobstructedly spraying and thereby loosening solid material as might otherwise gravitate at the bottom of said tank.

References Cited

UNITED STATES PATENTS

| | | | |
|---|---|---|---|
| 624,580 | 5/1899 | Tousey | 210—409 X |
| 894,679 | 7/1908 | Melvin | 210—409 X |
| 1,202,356 | 10/1916 | Blackmer | 210—409 X |
| 1,273,608 | 7/1918 | Hildebrand | 210—409 |
| 2,258,063 | 10/1941 | Meyer | 210—409 |
| 2,593,228 | 4/1952 | Wagner | 210—433 X |
| 2,602,697 | 7/1952 | Otto et al. | 210—198 X |
| 2,885,271 | 5/1959 | Kersh | 210—198 X |
| 2,911,902 | 11/1959 | Mueller | 210—409 X |
| 2,178,240 | 10/1939 | Pascale | 210—498 X |

REUBEN FRIEDMAN, *Primary Examiner.*

J. DE CESARE, *Assistant Examiner.*